Dec. 30, 1941.     E. GAUTHIER     2,268,391
APPARATUS FOR MEASURING THE RATE OF FLOW OF FLUID
Filed May 17, 1939

Inventor
Ernest Gauthier
By Bilinger, Atty.

Patented Dec. 30, 1941

2,268,391

UNITED STATES PATENT OFFICE 2,268,391

APPARATUS FOR MEASURING THE RATE OF FLOW OF FLUID

Ernest Gauthier, Paris, France

Application May 17, 1939, Serial No. 274,296
In France May 21, 1938

1 Claim. (Cl. 73—228)

The present invention relates to apparatus for measuring and indicating the rate of flow or delivery of a stream of fluid (gas, vapor or liquid) flowing through a conduit or the like.

The object of the present invention is to provide an apparatus of this type which is both accurate and very simple of construction.

According to an essential feature of the invention, this apparatus includes a round, preferably circular, box having a flat bottom and a flat cover, advantageously constituted by a transparent glass. Means are provided for admitting the fluid (gas or liquid) into said box close to the rounded (circular) wall thereof and in a substantially tangential direction, for instance through a suitable nozzle or deflector. This fluid is allowed to escape from said box through an outlet provided in the bottom of the apparatus.

In this box, there is provided a movable system including an arm rotatable about an axis transverse, and generally perpendicular, to the bottom of the apparatus, and fitted with a radial blade or plate, also transverse, and preferably perpendicular, to said bottom and moving along the lateral wall of the box. This pivoting arm is connected to a spiral spring (or any other equivalent elastic system) so that the angle through which it turns from its position of equilibrium is the greater as the effort applied to the plate or blade is higher.

The fluid (gas or liquid) that flows through the box moves along a circular path (or with a whirlwind motion) and exerts upon the plate or blade an effort which produces an angular displacement of the movable arm through an angle which is the greater as the rate of flow or delivery of said fluid is more considerable.

According to the nature of the fluid that is flowing through the apparatus, to each angle of deviation there corresponds a given value of the rate of flow, so that if the movable arm controls an index moving in front of an experimentally graduated scale, the rate of flow of the fluid can be read directly on said scale.

One feature of the present invention lies in the fact that the movable arm extends practically over the whole diameter of the box, whereby that part of the arm diametrically opposite the radial blade, forms a pointer integral with said arm.

Another feature of the invention is that the outlet for the fluid, instead of being provided on the circular wall as heretofore, is arranged in the bottom of the box, thus avoiding the troubles generally encountered when the blade during the rotation of the arm comes to lie just opposite an outlet in the circular wall.

As a rule, in the apparatus according to the present invention, the axis of oscillation of the movable arm will be concentric with the box, so that the blade or plate remains, in the course of its movement, at a constant distance from the circular lateral wall of said box.

Of course, there are many possible embodiments of the apparatus according to the invention and the invention is not limited to any of them, such as that which will be hereafter described, nor to details of construction.

Other features will result from the following detailed description of a specific embodiment thereof.

A preferred embodiment of the present invention will be hereinafter described, with reference to the accompanying drawing, given merely by way of example, and in which.

Figure 1:
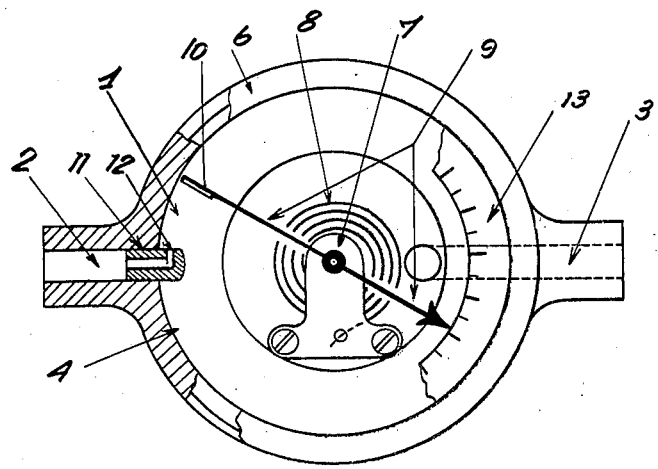
Fig. 1 is a plan view of an apparatus made according to the invention.
Figure 2:
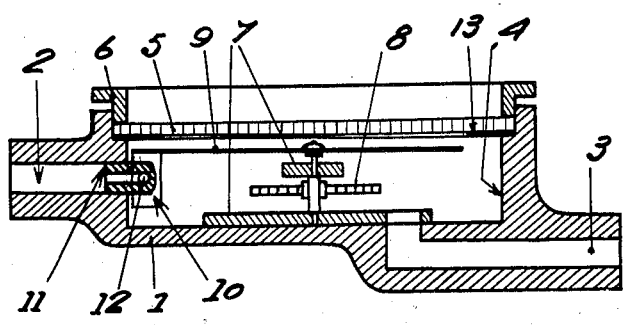
Fig. 2 is a sectional view taken in a diametral plane thereof.

In the apparatus illustrated by the drawing, the casing or box 1 has a flat bottom and it is fitted with a gas inlet tube 2 and a gas outlet tube 3 connected with the bottom of the box.

The inner wall 4 of this box is of circular shape and the cover of the box is constituted by a plane glass 5 held in position by means of a ring 6 which presses said glass plate 5 against a shoulder in the circular wall.

Inside this box 1, there is fixed a support 7 which carries a movable system including a pivoting arm 9, fitted at one of its ends with the above mentioned blade or plate 10, and urged toward a given angular position by a spiral spring 8. The arm 9 extends beyond the center of the box and the end opposite the one having the blade 10 thereon forms the pointer of the apparatus.

The inlet tube 2 leads to a nozzle 11 the outlet orifice 12 of which opens tangentially with respect to wall 4.

A graduated scale 13 interposed between the glass plate 5 and the aforesaid shoulder in the circular wall permits of reading the value of the rate of flow or delivery.

The apparatus above described will work in the following manner:

The gas flowing in through inlet tube 2 penetrates through nozzle 11 and hole 12 into box 1, where it is given a rotating movement along the wall 4 of the box. It causes the blade 10 together with the movable arm 9, forming the pointer, to move until a position of equilibrium is reached by said arm which is the more distant from the origin as the rate of flow of the gas stream is higher. The index-shaped portion of arm 9 gives, by reading on dial 13, the indication of the value of said rate of flow.

In a general manner, while I have, in the above description, disclosed what I deem to be a practical and efficient embodiment of the present invention, it should be well understood that I do not wish to be limited thereto as there might be changes made in the arrangement, disposition, and form of the parts without departing from the principle of the present invention as comprehended within the scope of the appended claim.

What I claim is:

An apparatus of the type described which comprises, in combination, a box having an inner cylindrical wall, a flat bottom, and a flat transparent cover forming the top wall of said box, a movable arm extending substantially over the whole diameter of the box, one end of said arm forming an index integral with the arm, said arm being pivotally mounted in said box about an axis perpendicular to said bottom and said cover, a blade carried by the other end of said arm and positioned transverse to said bottom and said cover, a fluid inlet in the cylindrical wall, means for causing the fluid flowing in through said inlet to move along a curved path following said wall, said means including a nozzle having a discharge aperture positioned adjacent and tangentially to said cylindrical wall and directed squarely against the center of the blade on said arm so that the blade is positively driven by the fluid discharged by said nozzle, a fluid outlet in the bottom of the box and opening directly upwardly into the path of flow in said box, and spring means for resiliently opposing the action of the incoming fluid on said blade.

ERNEST GAUTHIER.